UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

COMBINATION OF ORGANIC ACIDS.

1,203,499.  Specification of Letters Patent.  Patented Oct. 31, 1916.

No Drawing.  Application filed July 26, 1915. Serial No. 41,907.

*To all whom it may concern:*

Be it known that I, ALEX B. DAVIS, a citizen of the United States, residing at Indianapolis, Marion county, and State of Indiana, have invented and discovered certain new and useful Improvements in Combinations of Organic Acids, of which the following is a specification.

My invention relates to a combination of 2-phenyl-quinolin-4-carboxylic acid and salicylic acid. The compound is a useful therapeutic agent.

The preparation of the compound is carried out as follows:—249 parts by weight of 2-phenyl-quinolin-4-carboxylic-acid are dissolved in an alkaline solution preferably a solution of 42 parts of caustic soda in 1000 parts of water and to this, 160 parts of sodium salicylate are added. When the sodium salicylate has dissolved, the solution is chilled by the addition of a small amount of cracked ice and 200 parts of concentrated hydrochloric acid are added. A sticky yellow mass precipitates and soon solidifies to a mass of yellow crystals; the crystallization may be hastened by stirring rapidly. This mass is probably a molecular compound of the two acids, of the formula

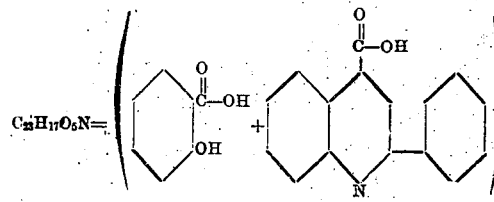

The compound is nearly tasteless, the acrid taste of the salicylic acid being almost completely masked by the combination. The compound is insoluble in water, slightly soluble in alcohol and readily soluble in acetone. Mineral acids other than hydrochloric acid may be used in precipitation.

What I claim is:

1. A combination of salicylic acid and 2-phenyl-quinolin-4-carboxylic acid.

2. A molecular compound of 2-phenyl-quinolin-4-carboxylic acid and salicylic acid.

3. The process of producing combinations of 2-phenyl-quinolin-4-carboxylic acid and salicylic acid by precipitating mixed solutions of their salts with mineral acids.

4. The process which consists in adding to a solution of the alkali salts of 2-phenyl-quinolin-4-carboxylic acid and salicylic acid in equimolecular proportion, a mineral acid, and thereby precipitating a body containing the 2-phenyl-quinolin-4-carboxylic acid and salicylic acid.

In witness whereof, I have hereunto set my hand and seal at Indianapolis, Indiana, this 21st day of July, A. D. nineteen hundred and fifteen.

ALEX B. DAVIS. [L. S.]

Witnesses:
A. C. RICE,
H. P. DOOLITTLE.